US011790781B2

(12) United States Patent
Park

(10) Patent No.: US 11,790,781 B2
(45) Date of Patent: Oct. 17, 2023

(54) METHOD AND SYSTEM FOR DETECTING SLIP ACCIDENT USING MOBILE DEVICE

(71) Applicants: Thinkware Corporation, Gyeonggi-Do (KR); iNavi systems Corporation, Gyeonggi-Do (KR)

(72) Inventor: Tae-hyeon Park, Gyeonggi-Do (KR)

(73) Assignees: THINKWARE CORPORATION, Gyeonggi-do (KR); INAVI SYSTEMS CORPORATION, Gyeonggi-do (KR)

( * ) Notice: Subject to any disclaimer, the term of this patent is extended or adjusted under 35 U.S.C. 154(b) by 176 days.

(21) Appl. No.: 17/322,044

(22) Filed: May 17, 2021

(65) Prior Publication Data

US 2021/0358301 A1    Nov. 18, 2021

(30) Foreign Application Priority Data

May 18, 2020    (KR) ........................ 10-2020-0058911

(51) Int. Cl.
| | |
|---|---|
| *G08G 1/127* | (2006.01) |
| *H04W 4/46* | (2018.01) |
| *H04W 4/44* | (2018.01) |
| *G01C 19/00* | (2013.01) |
| *G01S 19/42* | (2010.01) |
| *G01P 15/00* | (2006.01) |
| *B60W 40/10* | (2012.01) |
| *B60W 40/06* | (2012.01) |
| *G01S 19/52* | (2010.01) |

(52) U.S. Cl.
CPC ............ *G08G 1/127* (2013.01); *B60W 40/06* (2013.01); *B60W 40/10* (2013.01); *G01C 19/00* (2013.01); *G01P 15/00* (2013.01); *G01S 19/42* (2013.01); *G01S 19/52* (2013.01); *H04W 4/44* (2018.02); *H04W 4/46* (2018.02); *B60W 2520/10* (2013.01); *B60W 2552/05* (2020.02); *B60W 2555/20* (2020.02); *B60W 2556/65* (2020.02)

(58) Field of Classification Search
CPC ...... G08G 1/127; B60W 40/06; B60W 40/10; B60W 2520/10; B60W 2552/05; B60W 2555/20; B60W 2556/65; G01C 19/00; G01P 15/00; G01S 19/42; G01S 19/52; H04W 4/44; H04W 4/46
See application file for complete search history.

(56) References Cited

U.S. PATENT DOCUMENTS

| | | | |
|---|---|---|---|
| 2017/0057493 A1* | 3/2017 | Sato .................... | B60W 30/02 |
| 2018/0037222 A1* | 2/2018 | Mahabadi ......... | B60W 50/0097 |

FOREIGN PATENT DOCUMENTS

| | | | | |
|---|---|---|---|---|
| DE | 102010039823 | * | 8/2010 | ............. B60K 28/16 |
| JP | WO 2005012025 | * | 7/2004 | ............... B60K 6/46 |
| KR | 10-2010-0037368 | | 4/2010 | |
| KR | 1016968210000 | | 2/2017 | |
| KR | 1020170028767 | | 3/2017 | |

* cited by examiner

*Primary Examiner* — Hongmin Fan
(74) *Attorney, Agent, or Firm* — Hayes Soloway PC

(57) ABSTRACT

Disclosed is a method and system for detecting slip accident using mobile device. The system and method may monitor an amount of spin of a vehicle using a mobile device and if the vehicle spin amount exceeds the threshold, determine whether the vehicle slips on the roads or not by using navigation-related information of a point at which the amount of spin of the vehicle more than the certain amount.

19 Claims, 11 Drawing Sheets

| Steps | Reaction |
|---|---|
| First step (below a score of 70) | Caution |
| Second step (the score of 70 or above and below a score of 80) | Detour |
| Third step (the score of 80 or above and below a score of 90) | Control |
| Fourth step (the score of 90 or above) | Emergency call |

FIG. 5

METHOD AND SYSTEM FOR DETECTING SLIP ACCIDENT USING MOBILE DEVICE

CROSS-REFERENCE TO RELATED APPLICATIONS

This U.S. non-provisional application and claims the benefit of priority under 35 U.S.C. § 365(c) to Korean Patent Application No. 10-2020-0058911, filed May 18, 2020, the entire contents of which are incorporated herein by reference in their entirety.

BACKGROUND OF THE INVENTION

Field of Invention

The following description relates to a technique for detecting accidents by slipperiness of roads.

Description of Related Art

A navigation system displays a location of a vehicle in operation on a road map and provides various useful information such as road traffic conditions, gas stations, public offices or the like, as well as route information to a destination.

For example, Korean Patent Publication No. 10-2010-0037368 (Publication date: Apr. 9, 2010) discloses "NAVIGATION AND METHOD FOR EXPRESS TRAFFIC INFORMATION" which provides vehicles' routes.

BRIEF SUMMARY OF THE INVENTION

Accidents caused by black ice are continuing, which is a road freezing phenomenon in which a thin film of ice is formed as if coated on the road surface.

The accidents caused by black ice often occur in highways or expressways in a time when traffic volume is low, and may lead to major accidents, so that relatively more losses of life and property are caused than other types of accidents.

Since secondary accidents on a road traveling at a high speed such as highways or expressways cause more losses of life and property be caused than primary accidents that are caused by a preceding vehicle slipping, it is of importance to rapidly cope immediately after the primary accidents.

Conventionally, technical studies for preventing accidents caused by black ice are mainly for preventing primary accidents, and work on equipment for detecting a freezing zone continues.

Although research has been conducted to detect freezing points through an inspecting vehicle including an imaging device, a LiDAR, a steering angle sensor, a wheel sensor, etc., a lot of time and cost investment are required to inspect all of nationwide highways and major roads.

As another method for preventing accidents caused by black ice, a method of installing road surface temperature sensor or road surface heat rays at a spot prone to freeze is considered, but a lot of time and costs are required to create am infrastructure, and there is a problem that it is difficult to accurately predict and inspect the spot prone to freeze.

Since all roads including the nationwide highways and the major roads is to be monitored, and the spot where black ice is formed is also flexible, a method with minimal time and cost is needed.

The disclosure proposes a technique that may rapidly detect the primary accidents by the preceding vehicles slipping on roads, such as on black ice or in the rain and propagate their accident information, and that may utilize them to prevent the secondary accidents caused by the primary accidents and to rapidly cope with accidents.

A computer-implemented road slipperiness detection system comprising at least one processor implemented to execute computer-readable instructions included in a memory, wherein the at least one processor comprising: a monitoring unit to monitor an amount of spin of a vehicle using electronics; and a slip detecting unit that if the vehicle spins over a certain amount, determine whether the vehicle slips on the roads or not by using navigation-related information of a point at which the amount of spin of the vehicle is more than a certain amount, wherein the monitoring unit to: detect the amount of spin of the vehicle using a gyro sensor built in the electronics; detect a location and speed of the vehicle using a GPS module built in the electronics; and detect an amount of impact of the vehicle using an acceleration sensor built in the electronics, and, wherein the slip detecting unit switching to a slip determining mode for determining whether the vehicle slips on the roads or not if the vehicle spins over a certain amount.

A road slipperiness detection method executed in a computer system, the computer system comprising at least one processor configured to execute computer-readable instructions included in a memory, the road slipperiness detection method comprising: monitoring, by the at least one processor, an amount of spin of a vehicle using values of sensors of electronics; and if the vehicle spins over a certain amount, determining, by the at least one processor, whether the vehicle slips on the roads or not by using navigation-related information of a point at which the amount of spin of the vehicle more than the certain amount, wherein the monitoring comprising: detecting the amount of spin of the vehicle using a gyro sensor built in the electronics; detecting a location and speed of the vehicle using a GPS module built in the electronics; and detecting an amount of impact of the vehicle using an acceleration sensor built in the electronics, and wherein the determining comprising: switching to a slip determining mode for determining whether the vehicle slips on the roads or not if the vehicle spins over the certain amount.

A road slipperiness detection method executed in a mobile device implemented in a computer, the mobile device: at least one processor configured to execute computer-readable instructions included in a memory, the road slipperiness detection method comprising: where the mobile device is installed with a navigation program and used as a navigation terminal of the vehicle, monitoring the amount of spin of the vehicle using a gyro sensor built in the mobile device; and a slip detecting unit that if the vehicle spins over a certain amount, determine whether the vehicle slips on the roads or not by using navigation-related information of a point at which the amount of spin of the vehicle more than the certain amount, wherein the monitoring comprising: detecting the amount of spin of the vehicle using a gyro sensor built in the electronics, and wherein the determining comprising: switching to a slip determining mode for determining whether the vehicle slips on the roads or not if the vehicle spins over the certain amount.

According to various embodiments, it is possible to provide a realistic alternative capable of detecting an accident by slipperiness of roads, such as on black ice or in the rain, without infrastructure costs by detecting the accident by slipperiness of roads using a mobile device utilized as a navigation terminal.

According to various embodiments, it is possible to effectively reduce slip accidents caused by a reduction in road friction force, such as black ice-related accidents in wintertime, rain-related accident in summertime, etc. by rapidly propagating and guiding the primary accident information, as well as detect the slip accidents to prevent a secondary accident.

According to various embodiments, it is possible to further utilize information related to navigation (map data or route information) and/or various environmental information to provide accuracy of a result of detecting the slip.

According to various embodiments, it is possible to rapidly propagate the slippery road information caused by the black ice to the vehicles' drivers in the rear zones through an accident information API or various traffic communication networks.

According to various embodiments, it is possible to provide the road slip information caused by the black ice so as to enable step-wise reactions depending on an actual situation, thus reducing the degree of fatigue for the notification information, and supporting the road slip information so as to enable to cope with the road slip rapidly and suitably to the actual situation.

BRIEF DESCRIPTION OF THE DRAWINGS

FIG. 5 illustrates an example of step-wise reaction to a slippery road according to various embodiments;

DETAILED DESCRIPTION OF THE INVENTION

Figure 1:
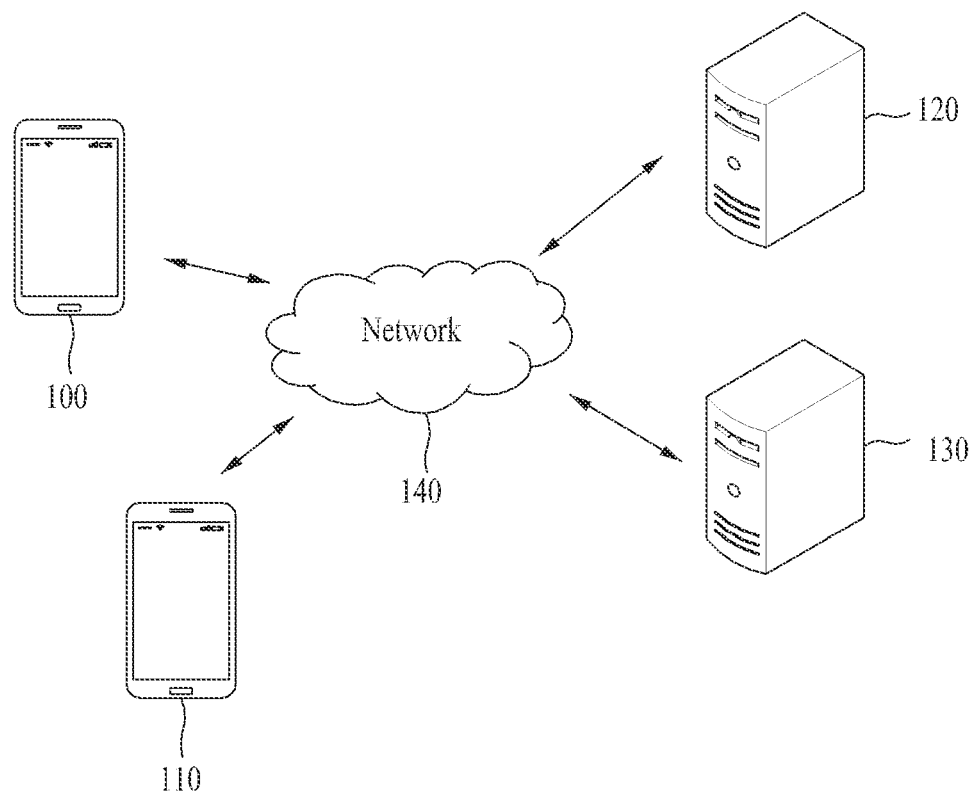
FIG. 1 illustrates an example of a network environment according to various embodiments.

Various embodiments of the present document are described below with reference to the accompanying drawings.

It is to be understood that the various embodiments of the present document and terms used herein are not intended to limit the technology described herein to particular embodiments, but are to cover various modifications, equivalents, and/or alternatives of the embodiments. In describing with reference to the drawings, like reference numerals may be used for like elements. The singular forms "a," "an," and "the" are intended to include the plural forms as well, unless the context clearly indicates otherwise. In the present document, the expressions "A or B," "at least one of A and/or B," "A, B, or C," or "at least one of A, B and/or, C" and the like may include all possible combinations of items listed together. The expressions "first", "second", "firstly" or "secondly" and the like may modify corresponding components, regardless of order or importance, and are used to distinguish one component from another, and do not limit the corresponding components. When a certain (e.g., first) component is referred to as being "(functionally or communicatively) coupled" or "connected" to another (e.g., second) component, the certain component may be directly coupled to another component or may be coupled via still another component (e.g., third component.)

The term "module" as used herein includes a unit configured in a hardware, a software, or a firmware and may be used interchangeably with terms such as, for example, logic, logic blocks, components, or circuits. The module may be a single piece part or a minimal unit or part thereof that performs one or more functions. For example, the module may be configured as an application-specific integrated circuit (ASIC).

Embodiments of the present document relate to a technique for detecting accident by slipperiness of roads.

Embodiments specifically disclosed herein may detect an accident by slipperiness of roads using a mobile device being utilized as a navigation terminal, thereby providing a realistic alternative capable of detecting an accident due to black ice without infrastructure costs.

FIG. 1 illustrates an example of a network environment according to various embodiments.

The network environment in FIG. 1 illustrates an example that includes a plurality of mobile devices 100, 110, a plurality of servers 120, 130, and a network 140. The number of mobile devices and the number of servers are not limited as shown in FIG. 1 for illustrative purposes of the present disclosure.

The plurality of mobile devices 100, 110 may be a mobile terminal implemented in a computer system, and a device installed with a navigation program and utilized as a navigation terminal for directions by each vehicle's driver. Examples of the plurality of mobile devices 100, 110 include a smart phone, a mobile phone, the navigation terminal, a tablet PC, a virtual reality (VR) device, an augmented reality (AR) device and the like. Although FIG. 1 illustrates a shape of the smart phone as an example of the mobile device 100, in various embodiments the mobile device 100 may refer to one of a variety of physical computer systems capable of communicating with other mobile devices 110 and/or servers 120, 130 over the network 140 by using a substantially wireless communication scheme.

The communication scheme may include, but not limited to, wireless communication between devices as well as communication schemes utilizing a communication network (e.g., a mobile communication network, a wireless Internet, a broadcast network, a satellite network, etc.) that network 140 may include. The mobile device 100 is configured to implement wireless communication with other mobile devices 110. For example, it is enabled to communicate with a user's mobile phone, or other wireless communication devices, other vehicles, central devices (traffic control devices), servers, etc. The mobile device 100 may transmit and receive wireless signals according to a connected wireless protocol. The wireless communication protocol may be Wi-Fi, 5th generation mobile communication (5G), Bluetooth, Long-Term Evolution (LTE), Code Division Multiple Access (CDMA), Wideband Code Division multiple Access (WCDMA), Global Systems for Mobile Communications (GSM), but the communication protocol is not limited thereto. In the present embodiment, the mobile device 100 may also implement inter-vehicle communication through wireless communication. That is, the mobile device 100 may communicate with other vehicle and other vehicles on the road through vehicle-to-vehicle (V2V) communication. The mobile device 100 may transmit and receive information such as a driving warning, traffic information through inter-vehicle communication, and may also request or receive the information from another vehicle. For example, the mobile device 100 may perform V2V communication as a dedicated short-range communication (DSRC) device or a Celluar-V2V (C-V2V) device. In addition to the vehicle-to-vehicle communication, Vehicle to Everything communication (V2X) between vehicles and other things (e.g., electronics carried by a pedestrian, etc.) may also be implemented over the network 140. For example, the network 140 may utilize communication networks included in a cooperative intelligent transportation system (C-ITS) in which V2V-, vehicle to infra (V2I)-based vehicles and servers 120, 130 share information, or may utilize communication networks included in Variable Message Sign (VMS) that provides incident information on roads for vehicles' drivers in rear zones.

Each of the servers 120, 130 may be implemented as a computer device or a plurality of computer devices that communicate with the plurality of mobile devices 100, 110 over the network 140 to provide instructions, codes, files, content, services, etc. For example, the server 120 may be a system which provides a first service to the plurality of mobile devices 100, 110 connected via the network 140, and the server 130 may also be a system which provides a second service to the plurality of mobile devices 100, 110 via the network 140. As a more specific example, the server 120 may provide a desired service (e.g., a navigation service) as a first service to the plurality of mobile devices 100, 110 via a dedicated application (e.g., a navigation program) installed on the mobile devices 100, 110, as a computer program installed on and running on the plurality of mobile devices 100, 110, or through web/mobile site access related to the server 110. In another example, the server 130 may provide an optional service associated with the first service as the second service through interworking with the server 120 to a server system in a traffic information central control center (e.g., a National Transport Information Center, a National Police Agency, Korea Expressway Corporation, etc.).

Figure 2:
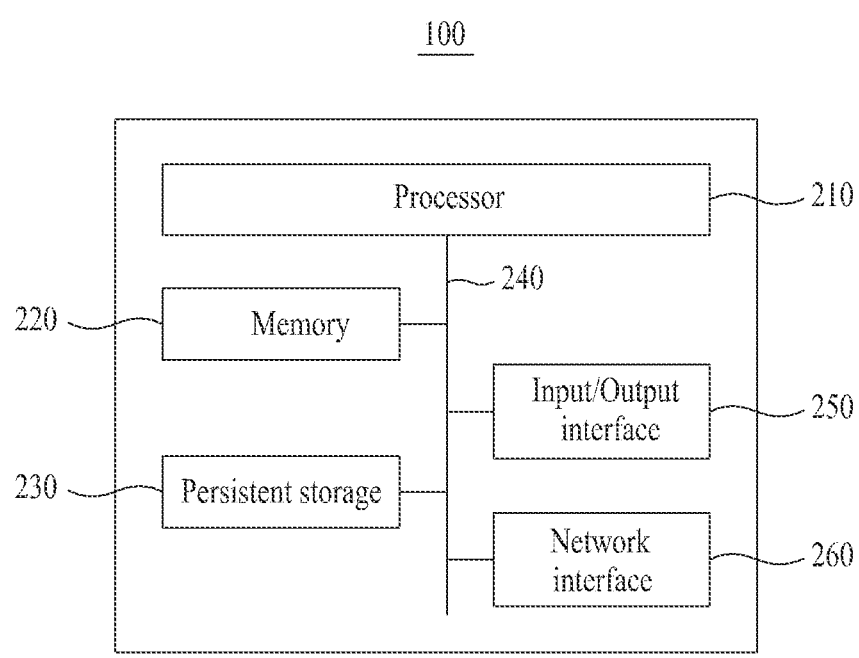
FIG. 2 is a block diagram for describing an example of an internal configuration of a mobile device according to various embodiments.

FIG. 2 is a block diagram for describing an example of an internal configuration of a mobile device according to various embodiments.

As shown in FIG. 2, the mobile device 100 includes a road slipperiness detection system implemented in a computer system, and may include a processor 210, a memory 220, a persistent storage 230, a bus 240, an input/output interface 250, and a network interface 260 as components for executing a road slipperiness detection method according to various embodiments.

The processor 210 may include or be part of any device capable of processing a sequence of instructions. For example, the processor 210 may include a computer processor, a digital processor and/or a processor in the mobile device or the other electronics. The processor 210 may be connected to memory 220 via the bus 240.

The memory 220 may include a volatile memory, a persistent memory, a virtual memory, or other memories for storing information used by or output by the mobile device 100. For example, the memory 220 may include a random access memory (RAM) and/or a dynamic RAM (DRAM). The memory 220 may be used to store any information, such as status information of the mobile device 100. The memory 220 may also be used to store instructions of the mobile device 100, including instructions for detecting a slippery road. The mobile device 100 may include one or more processors 210 as needed or where appropriate.

The bus 240 may include a communication infrastructure that enables an interaction between various components of the mobile device 100. The bus 240 may carry data between components of the mobile device 100, for example between the processor 210 and the memory 220. The bus 240 may include wireless and/or wired communication media between the components of the mobile device 100 and may be arranged in parallel, in serial, or in other topologies.

The persistent storage 230 may include components such as memory or other persistent storages as used by the mobile device 100 to store data for a predetermined extended period of time (e.g., compared to memory 220). The persistent storage 230 may include a non-volatile main memory as used by processor 210 in the mobile device 100. For example, the persistent storage 230 may include a flash memory, a hard disk, an optical disk, or other computer-readable media.

The input/output interface 250 may include interfaces to a keyboard, a mouse, a microphone, a camera, a display, or other input or output devices. Via the input/output interface 250, configuration commands and/or inputs related to the road slipperiness detection may be received.

The network interface 260 may include one or more interfaces to networks such as a local area network or the Internet. The network interface 260 may include interfaces to wired or wireless connections. The configuration commands may be received via the network interface 260. Also, information related to the road slipperiness detection may be received or transmitted via the network interface 260.

Further, in other embodiments, the mobile device 100 may include more components than those in FIG. 2. However, there is n need to clearly illustrate most existing technical components. For example, the mobile device 100 may be implemented to include at least some of the input/output devices connected with the above-described input/output interface 250, or may further include other components such as a transceiver, a Global Positioning System (GPS) module, a camera, a gyro sensor, an acceleration sensor, a database, etc.

In other embodiments, the server 120 may include a road slipperiness detection system, and although not specifically shown, the server 120 may also be implemented via the computer system described with reference to FIG. 2.

Figure 3:
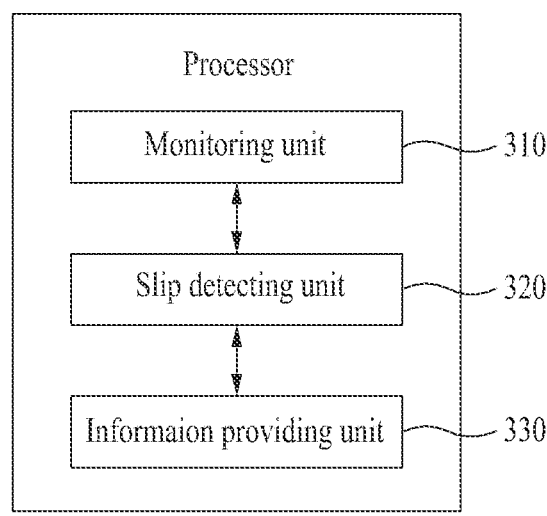
FIG. 3 is a block diagram illustrating an example of components that a processor of the mobile device may include according to various embodiments.
Figure 4:
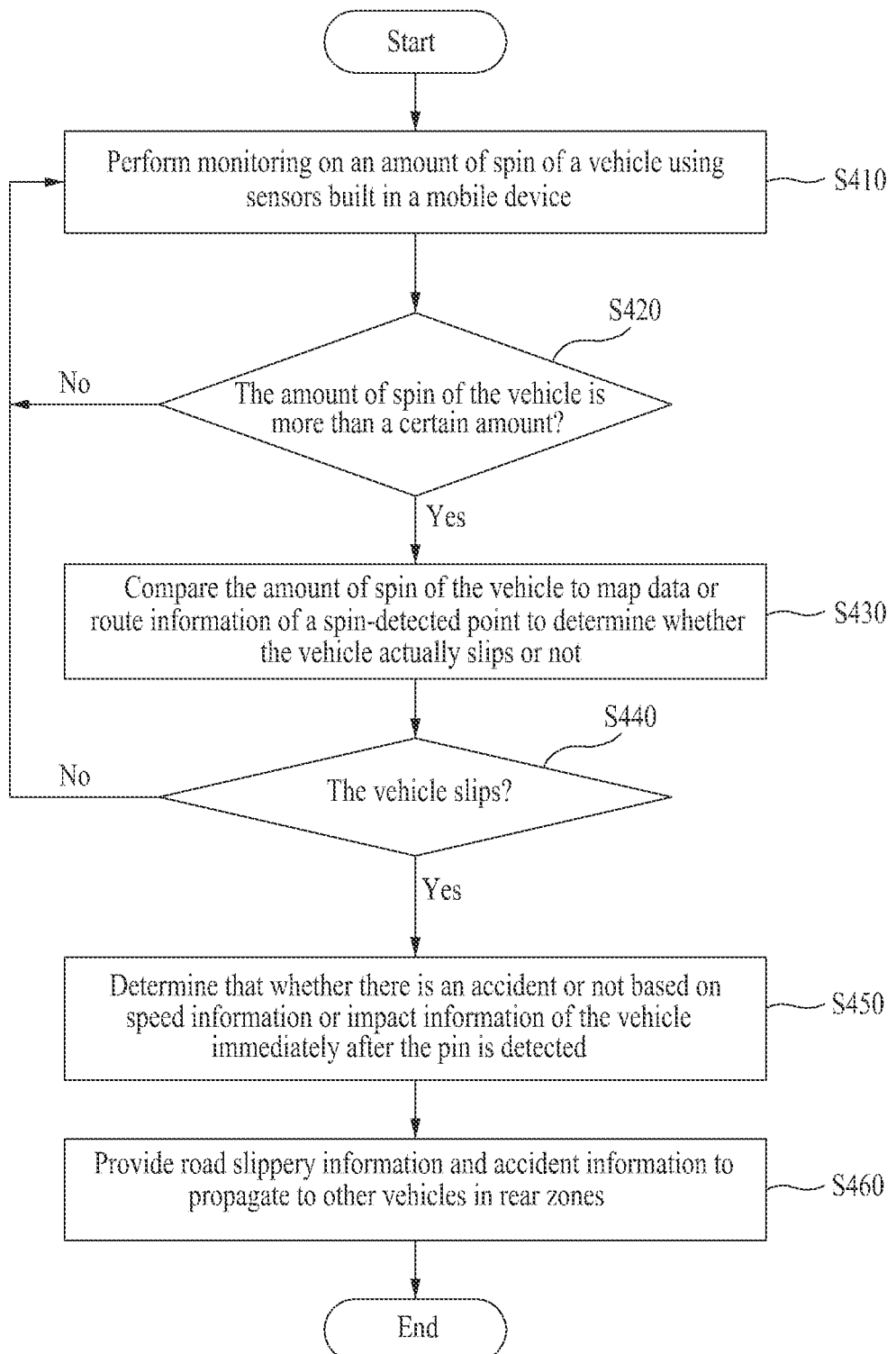
FIG. 4 is a flow diagram illustrating an example of how the mobile device may be performed according to various embodiments.

FIG. 3 is a block diagram illustrating an example of components that a processor of the mobile device may include according to various embodiments, and FIG. 4 is a flow diagram illustrating an example of how the mobile device may be performed according to various embodiments.

According to various embodiments, the mobile device 100 may be configured with a computer-implemented road slipperiness detection system. In one example, the road slipperiness detection system may be implemented as a stand-alone program to operate independently or implemented in an application to be operable on the application, and in some cases, may provide a road slipperiness detection function along with a navigation service through interworking with the server 120.

The road slipperiness detection system, which is implemented in the mobile device 100 based on commands provided by an application installed on the mobile device 100, may perform the road slipperiness detection method shown in FIG. 4.

The mobile device 100 may perform the road slipperiness detection method according to FIG. 4, and to do this, the processor 210 of the mobile device 100 may include a monitoring unit 310, a slip detecting unit 320, and an information providing unit 330 as shown in FIG. 3. In some embodiments, some components of the processor 210 may optionally be included in or excluded from the processor 210. Also, in some embodiments, some components of the processor 210 may be separated or combined for representations of functions of the processor 210.

Such a processor 210 and components of the processor 210 may control the mobile device 100 to perform steps S410-S460 included in the road slipperiness detection method in FIG. 4. For example, the processor 210 and components of the processor 210 may be implemented to execute instructions based on at least one program codes and operating system codes included in the memory 220.

Here, the components of the processor 210 may be representations of different functions of the processor 210, which are performed by the processor 210 based on instructions provided by program codes stored in mobile device 100 (e.g., instructions provided by an application running on the mobile device 100.) For example, the monitoring unit 310 may be used as a functional representation of the processor 210 that controls the mobile device 100 based on the above-described commands such that the mobile device 100 performs monitoring on an amount of spin of the vehicle.

The processor 210 may read the necessary commands from the memory 220 loaded with commands related to control of the mobile device 100. In this case, the read commands may include those for controlling the processor 210 to execute the steps S410-S460 to be described below.

Referring to FIG. 4, in step S410, the monitoring unit 310 may perform monitoring on the amount of spin of the vehicle using sensors built in the mobile device 100. The mobile device 100 may include a 3-axis gyro sensor, a GPS module, and an acceleration sensor, and the monitoring unit 310 may monitor the amount of spin of the vehicle with the 3-axis gyro sensor built in the mobile device 100. The monitoring unit 310 may monitor a location and a speed of the vehicle by utilizing GPS information acquired through the GPS module built in the mobile device 100 in the process of monitoring the amount of spin of the vehicle, and may also monitor an amount of impact of the vehicle through the acceleration sensor built in the mobile devices 100.

In step S420, the monitoring unit 310 determines whether the amount of spin of the vehicle detected by the 3-axis gyro sensor in the process of monitoring the amount of spin of the vehicle is over a certain amount. In the process of monitoring the amount of spin of the vehicle, the monitoring unit ignores the amount of spin the vehicle if it is less than a certain amount, and may switch to a slip determining mode if it is over the certain amount.

In steps S430-S440, the slip detecting unit 320 switches to the slip determining mode if the vehicle spins over the certain amount, may switch to a slip determining mode, wherein it may compare the amount of spin of the vehicle to map data or route information of a point (hereinafter referred to as a "spin-detected point") at which the amount of spin of the vehicle more than the certain amount based on the location provided by the GPS module built in the mobile device 100, and determine whether the vehicle actually slips on the road or not. The map data or route information utilized for detecting the slip is stored on the mobile device 100 on which the navigation program is installed, and in some embodiments, it is possible to utilize, for example, the map data and route information stored on server 120 if the mobile device 100 is not installed with the navigation program. In one example, the slip detecting unit 320 may compare the amount of spin of the vehicle to an actual road curvature information of the spin-detected point, and determine that it the vehicle does not slip on the road if the amount of spin is within a margin of error of the road curvature, while determining that the vehicle actually slips on the road if the vehicle spins over a road curvature. In another example, the slip detecting unit 320 may compare the amount of spin of the vehicle to the route information of the spin-detected point while directing the route information to a destination, and determine that the vehicle does not slip on the road if the amount of spin of the vehicle corresponds to spin information included in the route information, while determining that the vehicle actually slips on the road if the amount of spin of the vehicle is different from the spin information included in route information. For example, if while being directed to turn left, the vehicle spins in the opposite direction, or while being directed to move straight, the vehicle spins more than a certain amount, it may determine that the vehicle actually slips.

If there is no map data or route information in the mobile device 100, the server 120 may determine whether the vehicle actually slips or not. For example, the mobile device 100 may transmit location information (the spin-detected point) and sensor information (the amount of the spin and the amount of the impact) to the server 120 if the vehicle spins over a certain amount, in which based on the information received from the mobile device 100, the server 120 may determine whether the vehicle actually slips on the roads or not through the map data or route information of the spin-detected point.

In addition to the map data and route information of the navigation, additional information may be used to provide accuracy through verification of whether the vehicle slips or not.

In an example, the slip detecting unit 320 may perform false detection filtering based on the a road type of the spin-detected point, for example it may consider to be slipped in actuality if the vehicle spins more than a certain amount on a highway or expressway while it may consider to not be slipped in actuality if the vehicle spins more than a certain amount on a city street. Since U-turn in the city street is likely to be classified into more than the certain amount of spin by slipperiness, it is intended to eliminate such noise.

Also, the slip detecting unit 320 may weight the slipperiness based on additional information. In one example, the slip detecting unit 320 may weight the slipperiness based on terrain information including altitude or shaded zone of the spin-detected point, roads adjacent a mountain, and the like. For example, spin in a region where the altitude is higher than a certain level, the shaded zone such as an entrance to and exit of a tunnel or an interchange, etc. may be determined to be highly likely that the vehicle actually slips and weighted. In another example, the slip detecting unit 320 may weight the slipperiness based on weather information of a region corresponding to the spin-detected point, for example, spin in a weather situation under certain conditions, such as rainy or snowy, humid or foggy over a certain level, temperatures below a certain temperature, etc. at the spin-detected time or some time before that. It may be determined to be highly likely that the vehicle actually slips and weighted. In still another example, the slip detecting unit 320 may weight the slipperiness based on weather information of spin-detected point at the spin-detected time. The weather information may include regional weather, regional sunrise/sunset (or sun' position by time), etc. and the regional weather may include snowy, rainy, temperature, humid, foggy, rainfall, etc. For example, spin at sunrise or some time before sunrise, or at sunset or sometime after sunset may be determined to be highly likely that the vehicle actually slips and weighted. In still another example, the slip detecting unit 320 may weight the slipperiness based on traffic volume of spin-detected point at the spin-detected time, for example, spin in a time when the traffic volume is less than a certain volume may be determined to be highly likely that the vehicle actually slips and weighted.

Using one of the above-mentioned additional information or through at least a combination of two or more information, it is possible to perform verification as to whether the vehicle slips or not. Additional information for verifying as to whether the vehicle slips or not may utilize data obtainable from the navigation program, and may utilize information obtainable via a server 120 or an external server (e.g., server 130, such as the traffic information central control center, a search engine, etc.) providing the navigation service.

In step S450, the slip detecting unit 320 may determine that whether there is the vehicle accident or not caused by the slippery road through speed information or impact information of the vehicle detected within predetermined time immediately after more than the certain amount of spin is detected. The slip detecting unit 320 obtain the speed information provided by the GPS module built in the mobile device 100 immediately after the spin is detected or the impact information provided from the acceleration sensor built in the mobile device 100, and use these information to determine whether there is the vehicle accident or not.

The slip detecting unit 320 may determine that an accident of the vehicle occurs when the speed of the vehicle falls below a certain level or vehicle impact more than a certain level is detected immediately after more than the certain amount of spin is detected. In another example, it may determine that an accident of the vehicle occurs if GPS location information does not change at least for a predetermined time immediately after more than the certain amount of spin is detected.

In step S460, the information providing unit 330 may provide road slipperiness information determined in steps S430-S440 and accident information determined in step S450 to be able to propagate to other vehicles in rear zones. The road slipperiness information may include location information indicating the spin-detected point on the road, time information indicating a spin-detected time, and the like, and the accident information may include a notification of the accident of the vehicle occurs caused by slipping.

The information providing unit 330 may convert the road slipperiness information and the accident information into a score to provide step-wise reaction information or take step-wise follow-up measures according to the scores. Specifically, it may score the amount of spin and impact of the vehicle caused by the road slipperiness. For example, referring to FIG. 5, it may provide the reaction information according to a first step 'caution: ahead' if only more than a certain amount of spin is detected (below a score of 70), a second step 'detour driving' if a slowdown is detected with spin(the score of 70 or above and below a score of 80), a third step 'advanced control' if the vehicle impact is detected following slow down (the score of 80 or above and below a score of 90), and a fourth step 'emergency call' if secondary impact is continuously detected (the score of 90 or above).

Further, it is also possible to calculate the risk by the score (or a percentage), and to provide the reaction information or take follow-up measures according to predetermined stepwise thresholds. For example, if the percentage converted through the spin, the impact, and change of the GPS location is more than 90% (or, corresponds to the fourth step or more), it is possible to make connections to the accident handling agency (e.g., agencies such as 112, 119, or insurance companies) or the emergency contact.

Furthermore, it is possible to transmit coordinate information or accident spot information (an ambient sound input through the microphone of the smart phone, the impact information at the time of the accident, an ambient image captured in a black box when a mobile terminal and the black box are connected, and the like) together to them.

Figure 6:
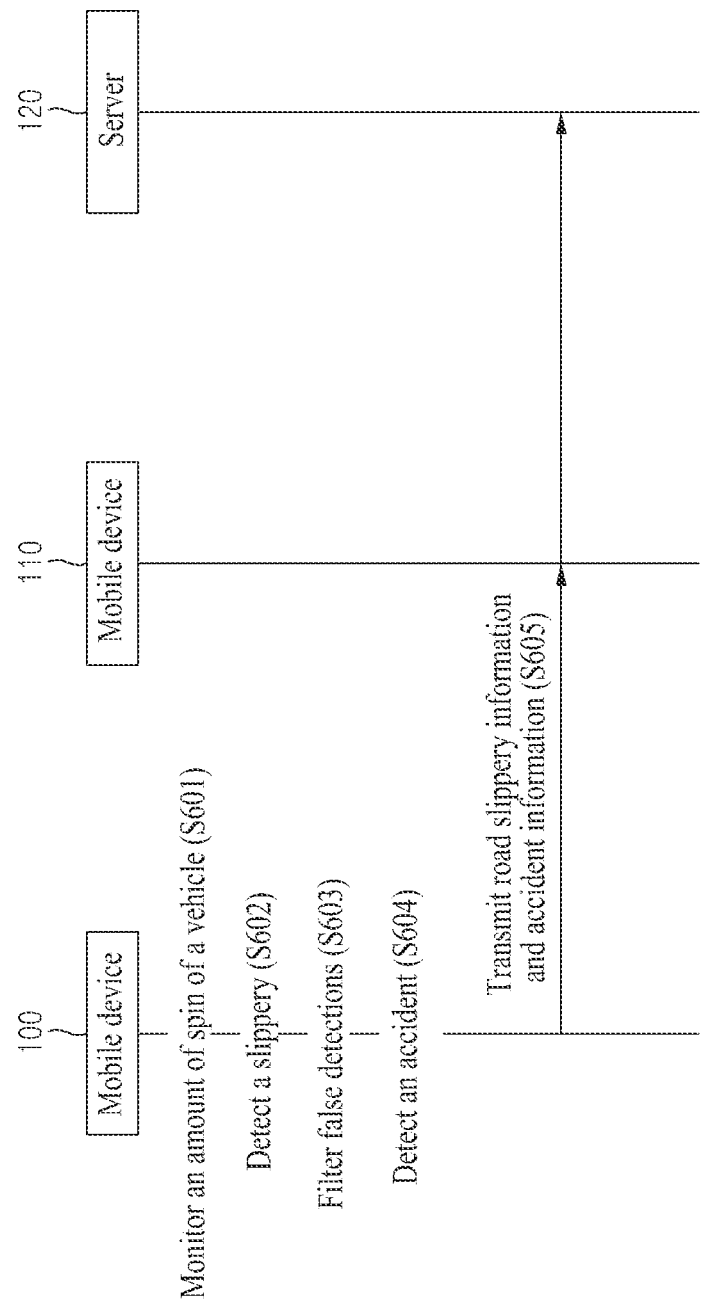
FIG. 6 illustrates an example of a process of detecting and reacting to a slippery road according to various embodiments.

FIG. 6 illustrates an example of a process of detecting and reacting to a slippery road according to various embodiments. FIG. 6 shows that the mobile device 100 is a subject of determining whether the vehicle slips on the roads or not and whether there is the vehicle accident or not.

Referring to FIG. 6, the mobile device 100 monitors the amount of spin of the vehicle using values of the gyro sensor in the process of executing an in-vehicle mobile navigation function (S601).

If more than a certain amount of spin is detected in the process of monitoring for the amount of the spin of the vehicle, the mobile device 100 may recognize that the road is slippery (S602) and filter false detections based on map data or route information of a spin-detected point (S603).

Here, it is also possible that the mobile device 100 weight the slipperiness based on the map data or route information of the spin-detected point.

The mobile device 100 may determine that whether there is the vehicle accident or not caused by the slippery road through speed information or impact information of the vehicle immediately after more than the certain amount of spin is detected (S604).

Since the steps S601-S604 for determining whether the vehicle slips on the roads or not and whether there is the vehicle accident or not correspond to the steps S410-S450, a detailed description thereof is omitted.

The mobile device 100 may transmit the slippery road information and accident information to at least one of the other mobile devices 110 and/or the plurality of servers 120, 130 via the network 140 (S605). For example, the mobile device 100 may transmit the slippery road information and accident information to the mobile device 110 of another vehicle or another device (e.g., VMS, roadside device) included in an infrastructure on a road, etc. via V2V or V2I communication. In addition, the mobile device 100 may transmit the slippery road information and accident information to the server 120 providing navigation services or the server 130 of a traffic information central control center (e.g., a National Transport Information Center, a National Police Agency, Korea Expressway Corporation, etc.) via a mobile communication network such as Wi-Fi or 5G or LTE.

Although the above-described embodiment describes reactions by determining whether the vehicle slips on the roads or not, or whether there is the vehicle accident or not in the mobile device 100 on which the mobile navigation, i.e., a navigation program is installed, it is not limited to this embodiment, and another embodiment in which some of the steps included in the road slipperiness detection method of FIG. 4 are performed in the server 120 is also implementable. For example, another embodiment in which the mobile device 100 provides the amount of spin of the vehicle and a location or speed of the vehicle to the server 120 and, the server 120 responds to whether the vehicle slips on the roads or not and whether there is the vehicle accident or not by determining these based on data provided by the mobile device 100 may be implement.

Figure 7:
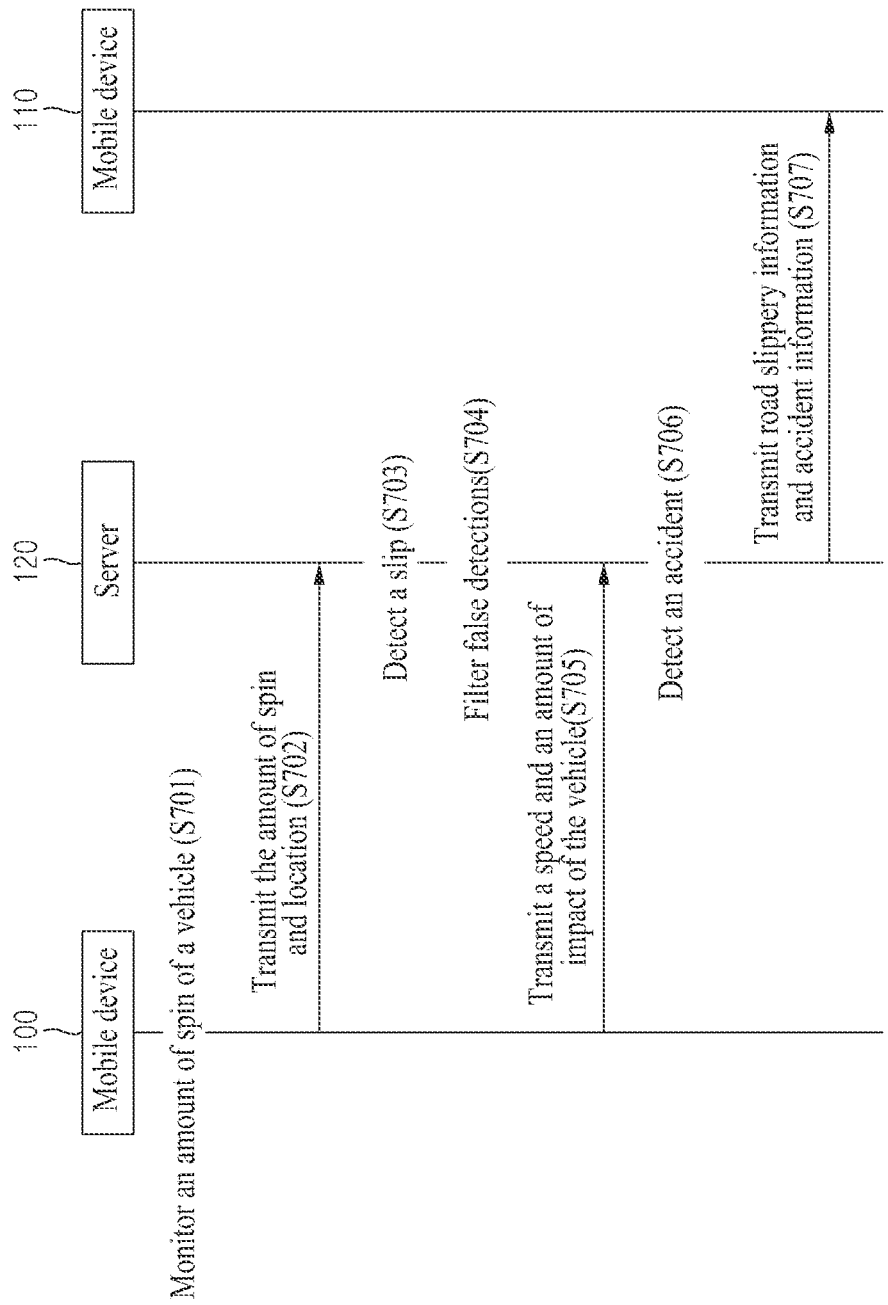
FIG. 7 illustrates another example of a process of detecting and reacting to a slippery road according to various embodiments.

FIG. 7 illustrates another example of a process of detecting and reacting to a slippery road according to various embodiments. FIG. 7 shows that the server 120 is a subject of determining whether the vehicle slips on the roads or not and whether there is the vehicle accident or not.

Referring to FIG. 7, the mobile device 100 monitors the amount of spin of the vehicle using values of the gyro sensor in the process of executing an in-vehicle mobile navigation function (S701).

If more than a certain amount of spin is detected in the process of monitoring for the amount of the spin of the vehicle, the mobile device 100 may transmit, to the server 120, the amount of spin of the vehicle and the location and speed of the vehicle (S702).

The server 120 may compare the amount of spin of the vehicle to the map data or route information of the location (i.e., the spin-detected point) of the vehicle transmitted from the mobile device 100, and determine whether the vehicle actually slips on the road (S703).

The server 120 may filter false detections as to whether the vehicle slips through additional information related to the spin-detected point (using additional information (road type, terrain information, weather information, traffic, etc.) related to the spin sensing point (S704).

The mobile device 100 may transmit to the server 120, the speed information or impact information of the vehicle detected within predetermined time immediately after more than the certain amount of spin is detected (S705).

The server 120 may determine whether the vehicle actually slips or not caused by the road slipperiness based on the speed information or impact information of the vehicle transmitted from the mobile device 100 (S706).

If the process of determining whether the vehicle slips on the roads or not and whether there is the vehicle accident or not is performed in the server 120, it is possible to apply uniform criteria and logics to determine the slip and the accident, and to cope with the road conditions more quickly.

Since the steps S703, S704, S706 for determining whether the vehicle slips on the roads or not and whether there is the vehicle accident or not correspond to the steps S410-S450, a detailed description thereof is omitted.

The server 120 may transmit the road slipperiness information and accident information of the mobile device 100 to the other mobile devices 110 and/or the other servers 130 via the network 140 (S707). For example, the server 120 may transmit the road slipperiness information and accident information to the server 130 of a traffic information central control center (e.g., a National Transport Information Center, a National Police Agency, Korea Expressway Corporation, etc.).

In addition, the server 120 may transmit the road slipperiness information and accident information to the other devices (e.g., VMS) included in the infrastructure on the road via a communication network included in C-ITS. The server 120 may support preemptive action such as preferentially figuring out the accident spot by utilizing CCTV included in the infrastructure on the road or utilizing drones in the case of the accident caused by the slippery road.

The server 120 may propagate a guidance of operation caution to another firm' navigation system or various traffic-related sites through various accident information APIs such as a National Police Agency, a National Transport Information Center, Korea Expressway Corporation, etc., wherein the National Transport Information Center or the like may receive the GPS location information corresponding to the spin-detected point (or the accident spot) and utilize the CCTV around it to handle or cope with the accident.

It is possible to utilize communication networks included in the infrastructure on the road as well as inter-vehicle communication to rapidly propagate and quickly react to the road slip information and accident information of the vehicle to the vehicles' drivers in the rear zones, and further to utilize various mobile communication networks applied to communication between mobile devices 100, 110 or communication between the mobile device 100 and the server 120.

Figure 8:
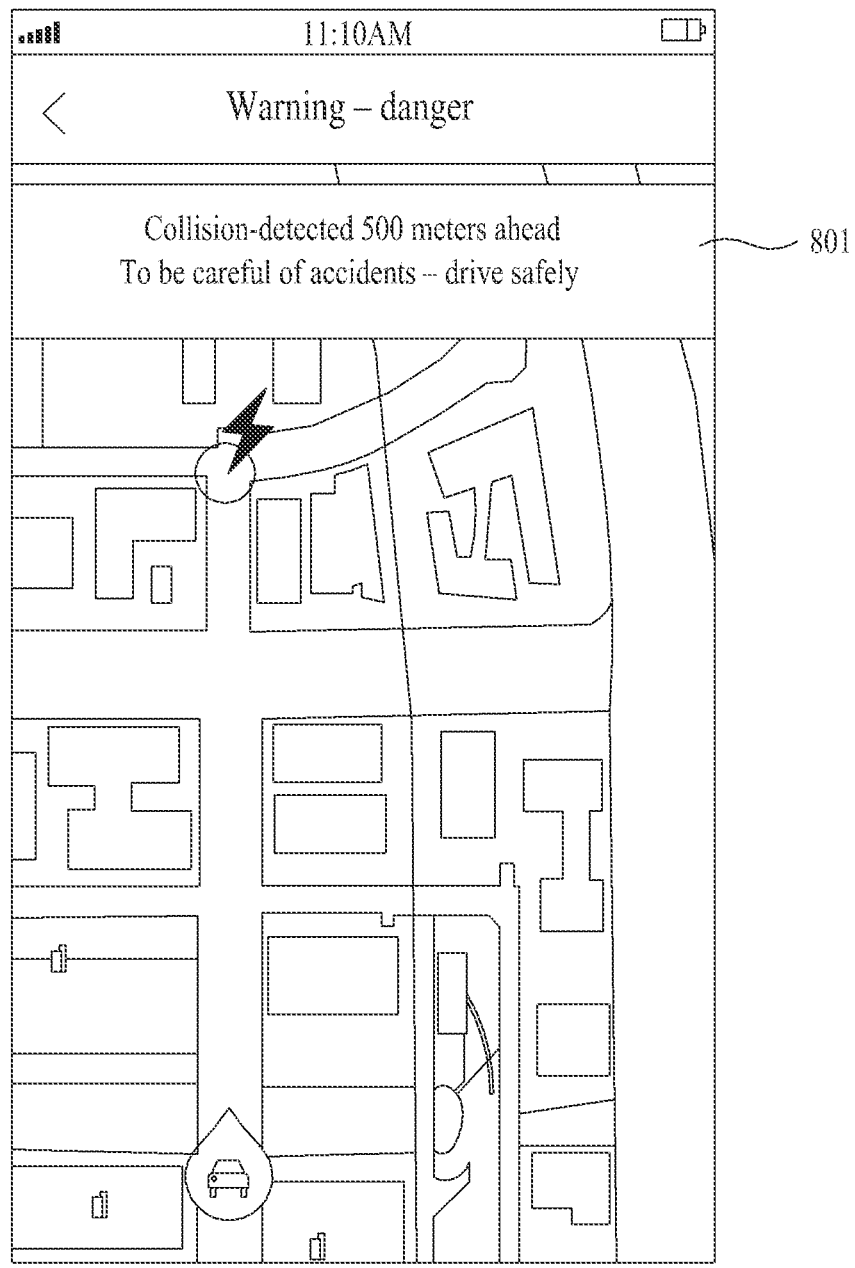
FIG. 8 illustrates an example of the reactions to the slip on the road and follow-up measures according to various embodiments.
Figure 9:
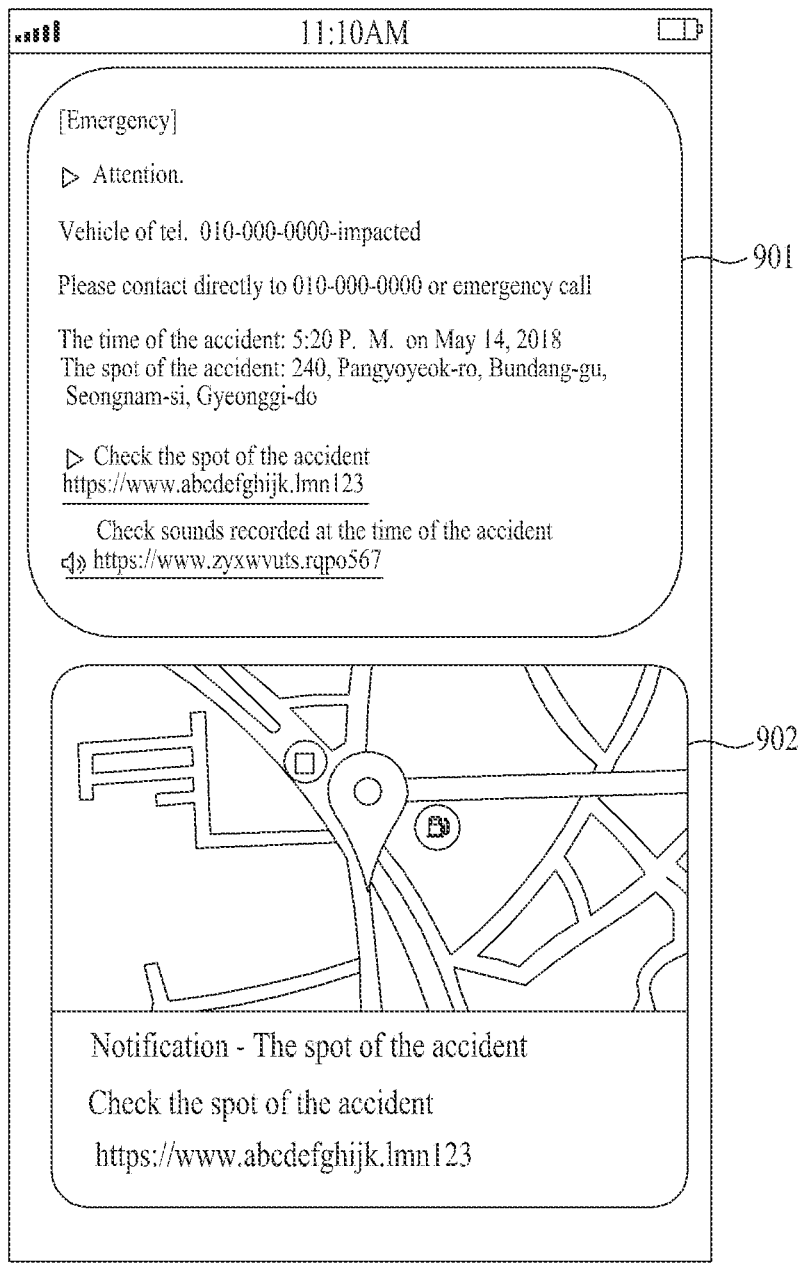
FIG. 9 illustrates an example of the reactions to the slip on the road and follow-up measures according to various embodiments.

FIGS. 8-9 illustrate an example of the reactions to the slip on the road and follow-up measures according to various embodiments.

In one example, the server 120 may transmit the road slipperiness information and accident information of the mobile device 100 to the other vehicles' drivers in rear zones. As shown in FIG. 8, a notification 801 including forward accident information may be displayed on a screen 800 of a device being used as the navigation terminal in the vehicles in the rear zones. Upon receiving the notification 801 while directing the route at the navigation terminal of the vehicles in the rear zones, an accident location may be displayed on the route-directed screen based on location information included in the notification 801. In some embodiment, the notification 801 may include a cause of the accident (such as the slippery road).

In another example, the server 120 may transmit an accident situation message to an accident handling agency or an emergency contact set by a user of the vehicle in question when a score based on the amount of spin and the amount of impact of the vehicle of the mobile device 100 caused by the road slip and the accident information is over a certain level. As shown in FIG. 9, the accident handling agency' or emergency contact' device may be displayed the notification 901 including the accident information of the vehicle of the mobile device 100 on an interface screen 900 associated with the navigation service. Here, the notification 901 may include information about an accident vehicle, an accident time or the accident location, the accident spot information (sound or video at the time of the accident), etc. The interface screen 900 may also be displayed with map information 902 indicating the accident location based on the location information included in the notification 901.

According to various embodiments, it is possible to effectively reduce slip accidents caused by a reduction in road friction force, such as black ice-related accidents in wintertime, rain-related accident in summertime, etc. by rapidly propagating and guiding the primary accident information, as well as detect the slip accident of a preceding vehicle to prevent a secondary accident.

According to various embodiments, it is possible to further utilize information related to navigation (map data or route information) and/or various environmental information to provide accuracy of a result of detecting the slip.

According to various embodiments, it is possible to rapidly propagate the slippery road information caused by the black ice to the vehicles' drivers in the rear zones through an accident information API or various traffic communication networks.

According to various embodiments, it is possible to provide the road slip information caused by the black ice so as to enable step-wise reactions depending on an actual situation, thus reducing the degree of fatigue for the notification information, and supporting the road slip information so as to enable to cope with the road slip rapidly and suitably to the actual situation.

Figure 10:
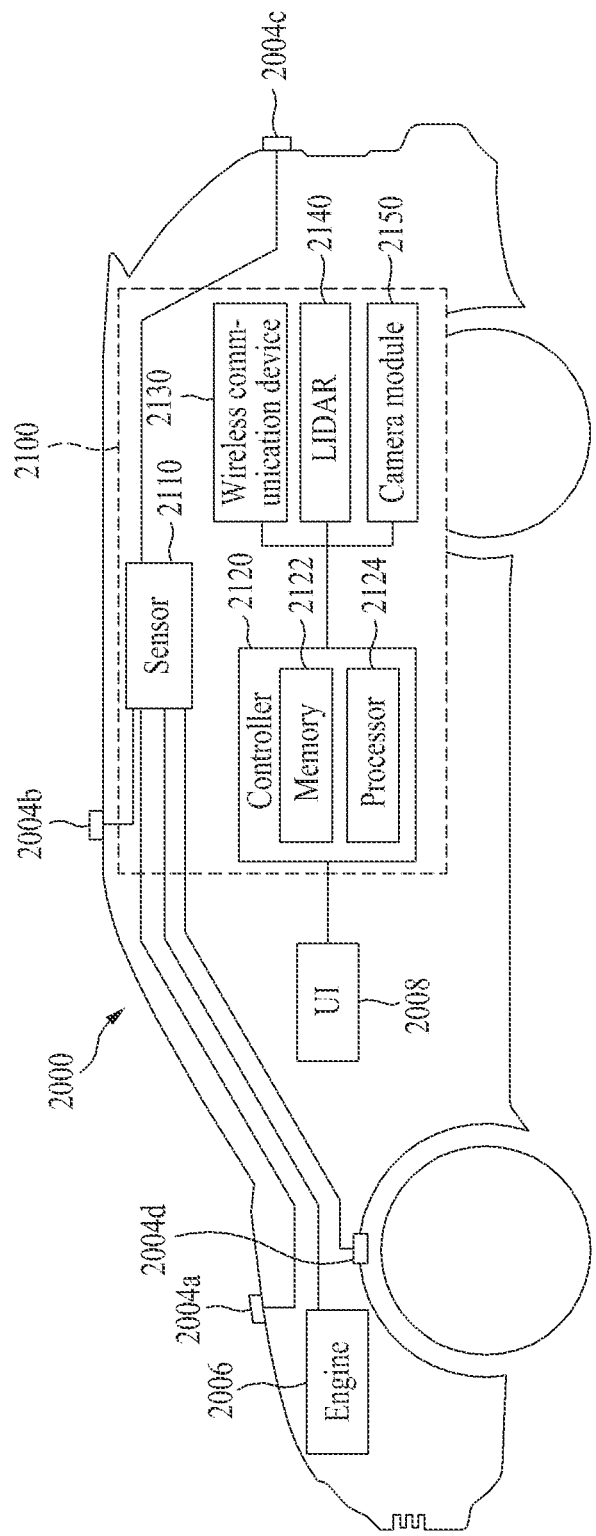
FIG. 10 illustrates a vehicle equipped with a control device according to various embodiments.
Figure 11:
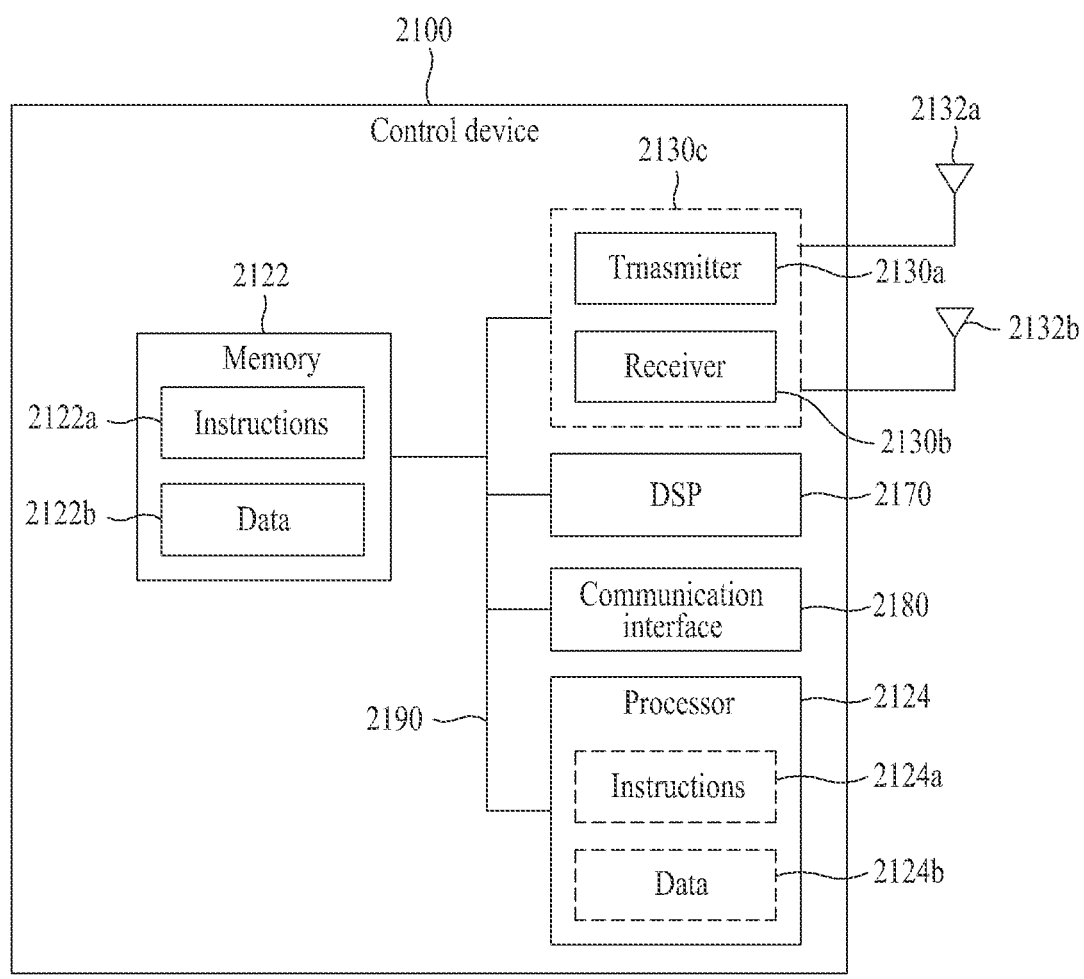
FIG. 11 illustrates the control device of FIG. 10.

FIG. 10 illustrates a vehicle equipped with a control device according to various embodiments, and FIG. 11 illustrates the control device of FIG. 10.

Referring to FIGS. 10 and 11, according to various embodiments, a control device 2100 may be mounted on the vehicle. Here, the vehicle may be an autonomous vehicle 2000.

In this embodiment, the control device 2100 may include a controller 2120 including a memory 2122 and a processor 2124, a sensor 2110, a wireless communication device 2130, a LIDAR 2140, and a camera module 2150.

In this embodiment, the controller 2120 may be configured at the time of manufacturing by manufacturers of the vehicle, or may be additionally configured to perform an autonomous driving functionality after manufacturing is done. Alternatively, it may be configured to perform additional functionality by consistently upgrading the controller 2120 configured at the time of manufacturing.

The controller 2120 may transmit control signals to the sensor 2110, an engine 2006, a user interface 2008, the wireless communication device 2130, the LIDAR 2140, and the camera module 2150 included as separate components in the vehicle. Although not shown, it is also possible to transmit the control signals to an acceleration device, a braking system, a steering device, or a navigation device related to driving the vehicle.

In the present embodiment, the controller 2120 may control the engine 2006 and may, for example, sense a speed limit of a road on which the autonomous vehicle 2000 is driving and control the engine 2006 so that the driving speed does not exceed the speed limit, or control the engine 2006 so as to accelerate the driving speed of the autonomous vehicle 2000 below the speeds limit. In addition, where sensing modules 2004a, 2004b, 2004c, 2004d senses an environment outside the vehicle and transmits it to the sensor 2110, the controller 2120 may receive it and generate a signal for controlling the engine 2006 or the steering device (not shown) to control the driving of the vehicle.

The controller 2120 may control the engine 2006 or the braking system to slow down the autonomous vehicle if there is another vehicle or obstacle in front of the vehicle, and may control a trajectory, an operating route, and a steering angle as well as a speed. Alternatively, the controller 2120 may generate a necessary control signal according to recognized information of external environments such as a driving lane of the vehicle and a traffic signal, etc. to control the driving of the vehicle.

In addition to generating its own control signal, the controller 2120 may also control the driving of the vehicle by performing communication with surrounding vehicles or a central server and sending commands for controlling the surroundings through the received information.

Further, since it may be difficult to accurately recognize the vehicle or the lane if a position or an angle of view of the camera module 2150 is changed, the controller 2120 may also generate a control signal to perform calibration of the camera module 2150 in order to prevent it from changing the position or the angle of view. Therefore, in the present embodiment, the controller 2120 generates the control signal to perform calibration to the camera module 2150, so that even if the position where the camera module 2150 be mounted is changed by vibration or impact generated from the autonomous vehicle' 2000 movements, it may continuously maintain the normal mounted position, an orientation, the angle of view, and the like of the cameras module 2150. The controller 2120 may generate the control signal to perform calibration of the camera module 2120 if measured information about the mounted position, the orientation, the angle of view information, etc. of the cameras module 2120 while the autonomous vehicle 2000 is driving are changed beyond a threshold value from pre-stored information about an initial mounted position, an orientation, an angle of view, etc. of the camera module 2120.

In this embodiment, the controller 2120 may include the memory 2122 and the processor 2124. The processor 2124 may execute a software stored in the memory 2122 according to the control signal of the controller 2120. Specifically, the controller 2120 may store data and instructions for performing the methods in accordance with various embodiments in the memory 2122, and the instructions may be executed by the processor 2124 to implement one or more methods disclosed herein.

Here, the memory 2122 may be stored on a non-volatile recording medium executable by the processor 2124. The memory 2122 may store a software and data via any suitable internal and external device. The memory 2122 may be configured as a random access memory (RAM), a read only memory (ROM), a hard disk, the memory 2122 device coupled to dongles.

The memory 2122 may store at least an operating system (OS), a user application, and executable instructions. The memory 2122 may also store application data, array data structures.

The processor 2124 may be a microprocessor or a suitable electronic processor, which may be a controller, a microcontroller or a state machine.

The processor 2124 may be implemented as a combination of computing devices, which may be, or be composed of, a digital signal processor, a microprocessor, or any suitable combination thereof.

In addition, in this embodiment, the control device 2100 may monitor features and detect status inside and outside of the autonomous vehicle 2000 with at least one or more sensors 2110.

The sensor 2110 may be composed of at least one or more sensing modules 2004, which may be implemented at specific locations of the autonomous vehicle 2000 depending on their detection purposes. It may be located at a lower, rear, front, upper, or side of the autonomous vehicle 2000, and may also be located in an internal part of the vehicle, a tire, or the like.

These allow the sensing module 2004 to detect information related to driving, such as the engine 2006, the tire, the steering angle, the speed, and a weight of the vehicle, as the internal information of the vehicle. Further, the at least one sensing modules 2004 may be composed of the acceleration sensor 2110, a gyroscope, an image sensor 2110, a RADAR, an ultrasonic sensor, a LiDAR sensor, or the like, and may detect movement information of the autonomous vehicle 2000.

The sensing module 2004 may also receive, as external information, specific data for the external environment status such as status information of a road on which the autonomous vehicle 2000 is located, surrounding vehicles' information, weather, etc., and accordingly, detect parameters of the vehicle. The detected information may be stored in memory 2122 temporarily or for a long time depending on their purposes.

In this embodiment, the sensor 2110 may integrate and collect information of the sensing modules 2004 for collecting information generated from the inside and outside of the autonomous vehicle 2000.

The control device 2100 may further include the wireless communication device 2130.

The wireless communication device 2130 is configured to implement wireless communication between autonomous vehicles 2000. For example, it enables the autonomous vehicle 2000 to communicate with a user's mobile phone, or other wireless communication devices 2130, other vehicles, central devices (traffic control devices), servers, etc. The wireless communication device 2130 may transmit and receive wireless signals according to a connected wireless protocol. The wireless communication protocol may be Wi-Fi, Bluetooth, Long-Term Evolution (LTE), Code Division Multiple Access (CDMA), Wideband Code Division multiple Access (WCDMA), Global Systems for Mobile Communications (GSM), but the communication protocol is not limited thereto.

In the present embodiment, the autonomous vehicle 2000 may also implement inter-vehicle communication through the wireless communication device 2130. That is, the wireless communication device 2130 may communicate with other vehicle and other vehicles on the road through vehicle-to-vehicle (V2V) communication. The autonomous vehicle 2000 may transmit and receive information such as a driving warning, traffic information through inter-vehicle communication, and may also request or receive the information from another vehicle. For example, the wireless communication device 2130 may perform V2V communication as a dedicated short-range communication (DSRC) device or a Celluar-V2V (C-V2V) device. In addition to the vehicle-to-vehicle communication, Vehicle to Everything communication (V2X) between vehicles and other things (e.g., electronics carried by a pedestrian, etc.) may also be implemented over the wireless communication device 2130.

Further, the control device 2100 may include the LIDAR device 2140. The LIDAR device 2140 may use the data sensed via the LIDAR sensor to detect objects around the autonomous vehicle 2000 during operation. The LIDAR device 2140 transmits the detected information to the controller 2120, which may operate the autonomous vehicle 2000 based on the detected information. For example, the controller 2120 may instruct the vehicle to slow down speed via the engine 2006 if there is a forward low-speed driving vehicle in the detected information. Alternatively, it may instruct the vehicle to slow down entering speed according to a curvature of a curved road that the vehicle enters.

The control device 2100 may further include the camera module 2150. The controller 2120 may extract the object information from an external image taken by the camera module 2150, and cause the controller 2120 to process this information.

In addition, the control device 2100 may further include imaging devices for recognizing external environment. In addition to the LIDAR 2140, the RADAR, a GPS device, an odometry, and other computer vision devices may be used, which may be selected as needed or operated simultaneously to enable more precise detection.

The autonomous vehicle 2000 may further include a user interface 2008 for user input to the control device 2100 described above. The user interface 2008 may allow a user to enter information through appropriate interaction. For example, it may be implemented as a touchscreen, a keypad, an operation button, etc. The user interface 2008 transmits the input or command to the controller 2120, which may perform a control operation over the vehicle in response to the input or command.

In addition, the user interface 2008 may enable autonomous vehicle 2000 to communicate with a device external to the autonomously vehicle 2000 via the wireless communication device 2130. For example, the user interface 2008 may be enabled to interact with a mobile phone, a tablet, or other computer devices.

Further, although in this embodiment the autonomous vehicle 2000 is described as including the engine 2006, it is also possible to include other types of propulsion systems. For example, the vehicle may be operated using electrical energy, hydrogen energy or a hybrid energy system that mixes the electrical energy and the hydrogen energy. Thus, the controller 2120 may include a propulsion mechanism according to the propulsion system of the autonomous vehicle 2000, and thus provide a control signal to configurations of each propulsion mechanism.

The detailed configuration of the control device 2100 for performing the methods in accordance with various embodiments will now be described in more detail with reference to FIG. 11.

The control device 2100 includes the processor 2124. The processor 2124 may be a general purpose single- or multiple-chip microprocessor, a special purpose microprocessor, a microcontroller, a programmable gate array, etc. The processor may also be referred to as a central processing unit (CPU). In this embodiment, the processor 2124 may also be used as a combination of a plurality of processors.

The control device 2100 also includes the memory 2122. The memory 2122 may be any electronic component that may store electronic information. The memory 2122 may also be include any combination of memories 2122 as well as single memory.

Data and instructions 2122a for performing methods in accordance with various embodiments may be stored in the memory 2122. When the processor 2124 executes the instructions 2122a, the instructions 2122a and all or some of data 2122b necessary to perform the instructions will be loaded 2124a, 2124b onto the processor 2124.

The control device 2100 may also include a transmitter 2130a, a receiver 2130b or a transceiver 2130c for allowing transmission and reception of signals. One or more antennas 2132a, 2132b may be electrically connected to the transmitter 2130a, the receiver 2130b, or each transceiver 2130c and may also include additional antennas.

The control device 2100 may also include a digital signal processor (DSP) 2170. The DSP 2170 may allow the vehicle to quickly process the digital signal.

The control device 2100 may also include the communication interface 2180. The communication interface 2180 may also include one or more ports and/or communication modules for connecting other devices with the control device 2100. The communication interface 2180 may allow the control device 2100 to interact with the users.

The various configurations of the control device 2100 may be coupled together by one or more buses 2190, which may include power buses, a control signal buses, status signal buses, data buses, etc. Under the control of the processor 2124, the configurations may transmit mutual information over the bus 2190 and perform desired functions.

The devices described above may be implemented as hardware components, software components, and/or any combination of hardware components and software components. For example, the devices and components described in the embodiments may be implemented using one or more general purpose or special purpose computers, such as a processor, a controller, a arithmetic logic unit (ALU), a digital signal processor, a microcomputer, a field programmable gate array (FPGA), a programmable logic unit, a microprocessor, or any other device capable of executing and responding to instructions. The processing unit may perform an operating system (OS) and one or more software applications running on the operating system. The processing unit may also access, store, manipulate, process, and generate data in response to execution of the software. For ease of understanding, although the processing unit may be described as being used alone, but one of ordinary skill in the art will recognize that the processing unit may include multiple processing elements and/or multiple types of processing elements. For example, the processing unit may include a plurality of processors or a processor and a controller. Other processing configurations are also possible, such as parallel processors.

The software may include computer programs, codes, instructions, or any combination of one or more of them, and may configure the processing unit to operate as desired, or may instruct it independently or collectively, The software and/or data may be embodied in any type of machines, components, physical devices, computer storage media, or devices, for being interpreted by, or providing instructions or data to, the processing unit. The software may be distributed over networked computer systems and stored or executed in a distributed manner. The software and data may be stored on one or more computer-readable storage media.

Methods according to the embodiments may be embodied in the form of program instructions which may be executed via various computer means and recorded on computer-readable media. Here, the media may continuously store the computer-executable programs, or temporarily store the programs for execution or download. In addition, the media may be various recording means or storage means in the form of a single or several pieces of the hardware combined, and is not limited to media directly connected to any computer system, and may also be distributed on the network. Examples of media may include magnetic media such as hard disks, floppy disks, and magnetic tapes, optical recording media such as CD-ROMs and DVDs, magneto-optical media such a floptical disk, and those configured to store program instructions, including ROM, RAM, flash memory, etc. Also, other examples of media may include recording media or storage media managed by an application store that distributes an application, a site that supplies or distributes various other softwares, servers, or the like.

Although the embodiments have been described above with reference to the limited embodiments and drawings, it is possible by one of ordinary skill in the art to be variously modified and varied from the above description. For example, appropriate results may be achieved even if the described techniques are performed out of the order described by methods, and/or even if some components of the described systems, structures, devices, circuits, etc. are combined in different forms from those described by methods, or replaced or substituted by the other components or equivalents.

Therefore, other implementations, other embodiments, and equivalents to the claims are within the scope of the following claims.

What is claimed is:

1. A computer-implemented road slipperiness detection system comprising:
   at least one processor implemented to execute computer-readable instructions included in a memory,
   wherein the at least one processor comprising:
   a monitoring unit to monitor an amount of spin of a vehicle using electronics; and
   a slip detecting unit initiated when the vehicle spin amount exceeds a threshold, determine whether the vehicle slips on the roads by using navigation-related information of a point at which the spin amount exceeded the threshold,
   wherein the monitoring unit:
   detects the amount of spin of the vehicle using a gyro sensor built in the electronics;
   detects a location and speed of the vehicle using a GPS module built in the electronics; and
   detects an amount of impact of the vehicle using an acceleration sensor built in the electronics, and,
   wherein the slip detecting unit
   switching to a slip determining mode for determining whether the vehicle slips on the roads if the vehicle spin amount exceeds the threshold.

2. The computer-implemented road slipperiness detection system of claim 1, wherein, if the vehicle spin amount exceeds the threshold, the at least one processor compares the amount of spin of the vehicle to a road curvature information of the point that is one of the navigation-related information, and determine that whether the vehicle slips on the roads.

3. The computer-implemented road slipperiness detection system of claim 1, wherein, if the vehicle spin amount exceeds the threshold, the at least one processor compares the amount of spin of the vehicle to spin information included in route information of the point that is one of the navigation-related information, and determine that whether the vehicle slips on the roads.

4. The computer-implemented road slipperiness detection system of claim 1, wherein the at least one processor performs verification of whether the vehicle slips using road-type data, terrain information, weather information, and traffic of the point that are additional information related to the point.

5. The computer-implemented road slipperiness detection system of claim 1, wherein the slip detecting unit determines that whether there is a vehicle accident caused by the road slipperiness through at least one of speed information and impact information of the vehicle detected within predetermined time immediately after the vehicle spin amount exceeds the threshold.

6. The computer-implemented road slipperiness detection system of claim 5, wherein the at least one processor further comprises an information providing unit to provide road slipperiness information based on whether the vehicle slips on the roads slipperiness and accident information based on whether there is the vehicle accident for propagation to the vehicle in rear zones.

7. The computer-implemented road slipperiness detection system of claim 5, wherein the at least one processor further comprises an information providing unit to provide road slipperiness information based on whether the vehicle slips on the roads, slipperiness and accident information based on the vehicle accident or other electronics information through vehicle-to-vehicle (V2V) communication or vehicle to infra (V2I) communication.

8. The computer-implemented road slipperiness detection system of claim 5, wherein the at least one processor further comprises an information providing unit to provide road slipperiness information based on whether the vehicle slips on the roads, slipperiness and accident information based on the vehicle accident or other devices included in an infrastructure on the road through a network included in C-ITS (cooperative intelligent transportation system).

9. The computer-implemented road slipperiness detection system of claim 5, wherein the at least one processor further comprises an information providing unit to convert road slipperiness information based on whether the vehicle slips on the roads, slipperiness and accident information based on the vehicle accident into scores and provide step-wise reaction information or take step-wise follow-up measures according to the converted scores.

10. The computer-implemented road slipperiness detection system of claim 9,
wherein, if the converted scores exceed a score threshold, the information providing unit transmits at least one of coordinate information and spot information about a point at which the vehicle accident occurs to an authority and an emergency contact.

11. A road slipperiness detection method executed in a computer system,
the computer system comprising at least one processor configured to execute computer-readable instructions included in a memory,
the road slipperiness detection method comprising:
monitoring, by the at least one processor, an amount of spin of a vehicle using values of sensors of electronics; and
if the vehicle spin amount exceeds a threshold, determining, by the at least one processor, whether the vehicle slips on the roads by using navigation-related information of a point at which the amount of spin of the vehicle more than the certain amount,
wherein the monitoring comprising:
detecting the amount of spin of the vehicle using a gyro sensor built in the electronics;
detecting a location and speed of the vehicle using a GPS module built in the electronics; and
detecting an amount of impact of the vehicle using an acceleration sensor built in the electronics, and
wherein the determining comprising:
switching to a slip determining mode for determining whether the vehicle slips on the roads if the vehicle spin amount exceeds the threshold.

12. The road slipperiness detection method of claim 11, wherein the determining comprising:
if the vehicle spin amount exceeds the threshold, comparing the amount of spin of the vehicle to a road curvature information of the point that is one of the navigation-related information, and determining that whether the vehicle slips on the roads.

13. The road slipperiness detection method of claim of claim 11,
wherein the determining comprising:
if the vehicle spin amount exceeds the threshold, comparing the amount of spin of the vehicle to spin information included in route information of the point that is one of the navigation-related information, and determining that whether the vehicle slips on the roads.

14. The road slipperiness detection method of claim of claim 11,
wherein the determining comprising:
performing verification of whether the vehicle slips using road-type information, terrain information, weather information, and traffic of the point that are additional information related to the point.

15. The road slipperiness detection method of claim of claim 11, the road slipperiness detection method further comprising:
determining, by the at least one processor, whether there is a vehicle accident caused by the road slipperiness through at least one of speed information and impact information of the vehicle detected within predetermined time immediately after the vehicle spin amount exceeds the threshold.

16. The road slipperiness detection method of claim 15, further comprising:
providing, by the at least one processor, road slipperiness information based on whether the vehicle slips on the roads, slipperiness and accident information based on whether there is the vehicle accident for propagation to the vehicle in rear zones.

17. The road slipperiness detection method of claim 15, wherein the providing comprising:
providing road slipperiness information based on whether the vehicle slips on the roads and slipperiness and accident information based on whether there is the vehicle accident for other electronics through vehicle-to-vehicle (V2V) communication or vehicle to infra (V2I) communication, or for other devices included in an infrastructure on the road through a network included in C-ITS.

18. The road slipperiness detection method of claim 15, wherein the providing comprising:
converting road slipperiness information based on whether the vehicle slips on the roads and slipperiness and accident information based on whether there is the vehicle accident into scores and providing step-wise reaction information or take step-wise follow-up measures according to the converted scores.

19. The road slipperiness detection method of claim of claim 18, wherein the performing comprising:
if the converted scores exceed a score threshold, transmitting at least one of coordinate information and spot information about a point at which the accident of the vehicle occurs to an authority and an emergency contact.

* * * * *